(12) United States Patent
Long et al.

(10) Patent No.: US 8,036,996 B2
(45) Date of Patent: Oct. 11, 2011

(54) SYSTEMS AND METHODS FOR MARTINGALE BOOSTING IN MACHINE LEARNING

(75) Inventors: Philip M. Long, Palo Alto, CA (US); Rocco A. Servedio, New York, NY (US); Roger N. Anderson, New York, NY (US); Albert Boulanger, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 390 days.

(21) Appl. No.: 12/045,458

(22) Filed: Mar. 10, 2008

(65) Prior Publication Data

US 2008/0270329 A1    Oct. 30, 2008

Related U.S. Application Data (63) Continuation of application No. PCT/US2006/035775, filed on Sep. 12, 2006.

(60) Provisional application No. 60/716,615, filed on Sep. 13, 2005.

(51) Int. Cl.
*G06F 15/18* (2006.01)
*G06F 17/18* (2006.01)
*G06F 19/24* (2011.01)

(52) U.S. Cl. .................. 706/12; 706/20; 706/21
(58) Field of Classification Search ............... 706/12
See application file for complete search history.

(56) References Cited

U.S. PATENT DOCUMENTS

| | | | |
|---|---|---|---|
| 6,772,211 | B2 | 8/2004 | Lu et al. |
| 6,829,384 | B2 | 12/2004 | Schneiderman et al. |
| 6,944,678 | B2 | 9/2005 | Lu et al. |

OTHER PUBLICATIONS

Long et al., Martingale Boosting, Jun. 2005.*
Learning Theory, 18th Annual Conference on Learning Theory, COLT 2005, Bertinoro, Italy, Jun. 27-30, 2005, Proceedings.*

* cited by examiner

*Primary Examiner* — Jeffrey A Gaffin
*Assistant Examiner* — Nathan H Brown, Jr.
(74) *Attorney, Agent, or Firm* — Baker Botts LLP (57) ABSTRACT

Boosting algorithms are provided for accelerated machine learning in the presence of misclassification noise. In an exemplary embodiment, a machine learning method having multiple learning stages is provided. Each learning stage may include partitioning examples into bins, choosing a base classifier for each bin, and assigning an example to a bin by counting the number of positive predictions previously made by the base classifier associated with the bin.

15 Claims, 5 Drawing Sheets

FIG. 1

Learning process 200

| 210 Find score having the strongest association with the past failure rate |
|---|
| 220 Sort feeder list by the score most associated with past failure |
| 230 Divide sorted list into two sublists |
| 240 Find the score having the strongest association with the past failure rate in each sublist |
| 250 Sort the feeders in each of the sublists by the score most associated with past failure |
| 260 Combine the two sublists together in one list |
| 270 Divide the combined list into three sublists |

SYSTEMS AND METHODS FOR MARTINGALE BOOSTING IN MACHINE LEARNING

CROSS-REFERENCE TO RELATED APPLICATIONS

This application a continuation of PCT International Application No. PCT/US2006/035775 filed Sep. 12, 2006 which claims the benefit of U.S. provisional application Ser. No. 60/716,615 filed Sep. 13, 2005, which are hereby incorporated by reference herein in their entireties.

FIELD OF THE INVENTION

The present invention relates to systems and methods for machine learning.

BACKGROUND OF THE INVENTION

Computational learning or machine learning is about computer programs or algorithms that automatically improve their performance through experience over time. Machine learning algorithms can be exploited for automatic performance improvement through learning in many fields including, for example, planning and scheduling, bio-informatics, natural language processing, information retrieval, speech processing, behavior prediction, and face and handwriting recognition.

An approach to developing useful machine learning algorithms is based on statistical modeling of data. With a statistical model in hand, probability theory and decision theory can be used to develop machine learning algorithms. Statistical models that are commonly used for developing machine learning algorithms may include, for example, regression, neural network, linear classifier, support vector machine, Markov chain, and decision tree models. This statistical approach may be contrasted to other approaches in which training data is used merely to select among different algorithms or to approaches in which heuristics or common sense is used to design an algorithm.

In mathematical terms, a goal of machine learning is to be able to predict the value of a random variable y from a measurement x (e.g., predicting the value of engine efficiency based on a measurement of oil pressure in an engine). The machine learning processes may involve statistical data resampling techniques or procedures such as bootstrapping, bagging, and boosting, which allow extraction of additional information from a training data set.

The technique of bootstrapping was originally developed in statistical data analysis to help determine how much the results extracted from a training data set might have changed if another random sample had been used instead, or how different the results might be when a model is applied to new data. In bootstrapping, resampling is used to generate multiple versions of the training data set (replications). A separate analysis is conducted for each replication, and then the results are averaged. If the separate analyses differ considerably from each other, suggesting, for example, decision tree instability, the averaging will stabilize the results and yield predictions that are more accurate. In bootstrap aggregation (or bagging) procedures, each new resample is drawn in the identical way. In boosting procedures, the way a resample is drawn for the next tree depends on the performance of prior trees.

Although boosting procedures may theoretically yield significant reduction in predictive error, they perform poorly when error or noise exists in the training data set. The poor performance of boosting procedures is often a result of overfitting the training data set, since the later resampled training sets can over-emphasize examples that are noise. Further, recent attempts to provide noise-tolerant boosting algorithms fail to provide acceptable solutions for practical or realistic data situations, for example, because their methods for updating probabilities can over-emphasize noisy data examples. Accordingly, a need exists for a boosting procedure having good predictive characteristics even when applied to practical noisy data sets.

Consideration is now being given to improving prior art systems and methods for machine learning. Attention is particularly directed to improving boosting procedures. Desirable boosting procedures are noise-tolerant in realistic or practical data situations.

SUMMARY OF THE INVENTION

Systems and methods are provided for machine learning in the presence of noise.

In an exemplary embodiment, a machine learning method having multiple learning stages is provided. Each learning stage may include partitioning examples into bins, choosing a base classifier for each bin, and assigning an example to a bin by counting the number of positive predictions previously made by the base classifier associated with the particular bin.

BRIEF DESCRIPTION OF THE DRAWINGS

Further features of the invention, its nature, and various advantages will be more apparent from the following detailed description and the accompanying drawings in which.

DETAILED DESCRIPTION

Machine learning systems and methods are provided. The systems and methods are based on noise-tolerant boosting algorithms. The systems and methods use boosting techniques that can achieve high accuracy in the presence of misclassification noise. The boosting algorithms (referred to herein as "martingale" boosting algorithms) are designed to reweigh data examples so that error rates are balanced or nearly balanced at each successive learning stage. The error rates are balanced or nearly balanced in a manner that preserves noise tolerance.

A machine learning system for automated learning using martingale boosting combines simple predictors into more sophisticated aggregate predictors. Learning proceeds in stages. At each stage, the algorithm partitions training data examples into bins. A bin consists of examples that are regarded as roughly equivalent by the simple predictors chosen in earlier stage. The boosting algorithm chooses a simple model for each bin. The simple models are chosen so as to ensure nontrivial accuracy on examples in the bins for each of several types of bins.

An embodiment of the martingale boosting technique ranks items or objects in order of the likelihood that they have a particular property, behavior or characteristic. This embodiment has been applied to order power distribution cables (i.e., feeders) in an electrical power distribution system by how likely they are to fail.

A machine learning system used for predicting the failure of feeders in an electrical power distribution system includes a boosting algorithm. Past feeder failure events are known and the feeders are associated with a plurality of scores that are predictive of feeder failure. The algorithm processes a list of feeders and the associated plurality of scores in a number of successive learning stages. At each learning stage, the list of feeders is partitioned into a number of sublists so that the past feeder failure events are distributed substantially evenly across the number of sublists. For each sublist, a predictive score is chosen from the plurality of predictive scores associated with the objects in the sublist. Next, the feeders in the sublist are ranked according to the chosen predictive score. Then, the sublists are recombined to generate a list in which the feeders are ranked according to the predictive scores chosen for the respective sublists.

An example of the martingale boosting technique concerns the prediction of binary classifications (i.e., 0 and 1). Here, the simple predictors are simple binary classifiers ("base classifiers"). Leaning proceeds incrementally in stages. At each stage, data examples are partitioned into bins, and a separate base classifier is chosen for each bin. A data example is assigned to a bin by counting the number of positive (i.e., "1") predictions made by the appropriate base classifiers from earlier learning stages or iterations. Preferred embodiments of the boosting techniques are designed to classify an object by a random walk on the number of base classifiers that are positive predictions. When the error rates are balanced between false positives and false negatives, and are slightly better than random guessing, more than half the algorithmic learning steps are in the correct direction (i.e., the data examples are classified correctly by the boosted classifier).

Certain embodiments of the martingale boosting algorithms achieve noise tolerance by virtue of the fact that, by design, the probability of a data example reaching a given bin depends on the predictions made by the earlier base classifiers, and not on the label of the data example. In particular, the probability of a data example reaching a given bin, unlike the case in prior art boosting algorithms such as "Boost-by-Majority" algorithms, does not depend on the number of predictions that are correct or incorrect.

Certain embodiments of the martingale boosting algorithms also make it possible to force a standard weak learner to produce a classifier with balanced error rates in appropriate situations. For example, if decision tree stumps are used as the base classifiers, the threshold of the stump may be chosen to balance the error rates on positive and negative examples. In some embodiments of the inventive martingale boosting algorithms, the balanced error rates may be promoted directly, for example, by using decision stumps as base classifiers ("martingale ranking algorithms"). Such embodiments allow easy adjustment of the threshold required to balance the error rates on the training data.

Figure 1:
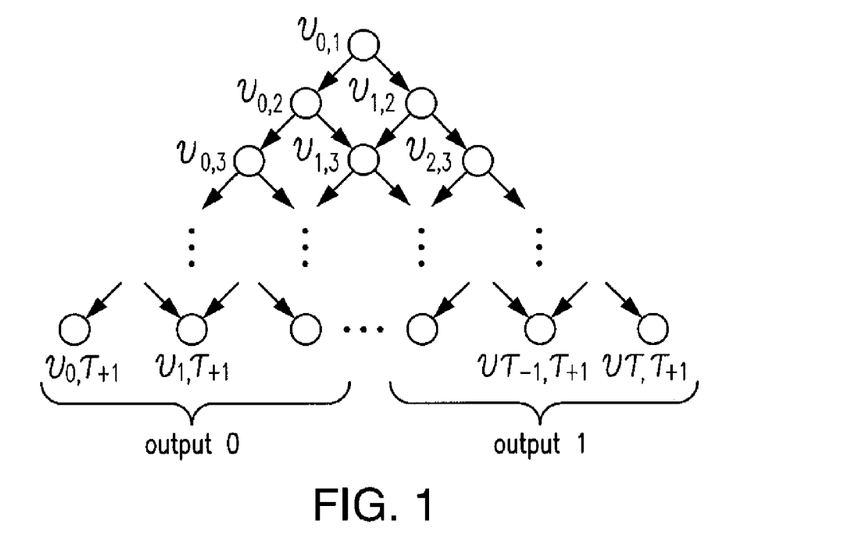
FIG. 1 is a schematic illustration of a machine learning branching program provided by a martingale boosting algorithm in accordance with the principles of the present invention.

The general architecture or framework of a martingale boosting algorithm is described herein with reference to FIG. 1, which shows the graph structure of a machine learning branching program produced by the martingale boosting algorithm. In the figure, each node $v_{i,t}$ of the branching program is labeled with a binary-valued function $h_{i,t}$ having values 0 or 1. At each node shown in the figure, the left edges correspond to 0 and the right edges to 1.

As an aid in understanding the martingale boosting algorithms, it is useful at this stage in the description to consider the training data examples as being generated from a probability distribution. Further, it is useful to introduce the following notation: X is the set of items to be classified, and c: X→{0,1} is the target concept, which assigns the correct classification to each item. The distribution over X generating the data is called D. $D^+$ denotes the distribution D restricted to the positive examples $\{x \in X: c(x)=1\}$. Thus, for any event:

$$S \subseteq \{x \in X: c(x)=1\}, Pr_{D^+}[x \in S] = Pr_D[x \in S]/Pr_D[c(x)=1]. \quad (1)$$

Similarly, $D^-$ denotes D restricted to the negative examples $\{x \in X: c(x)=0\}$.

The boosting algorithm shown in FIG. 1 works in a series of T stages. The hypothesis of the boosting algorithm is a layered branching program with T+1 layers in a grid graph structure, where layer t has t nodes (see FIG. 1). The i-th node from the left is referred to and labeled as $v_{i,t}$, where i ranges from 1 to t-1. For $1 \leq t \leq T$, each node $v_{i,t}$ in layer t has two outgoing edges—a left edge to node $v_{i,t+1}$, and a right edge to node $v_{i,1, t+1}$. In FIG. 1 the left and right edges are labeled 0 and 1, respectively. Nodes $v_{i,t+1}$ in layer T+1 have no outgoing edges.

Before stage t of the boosting algorithm begins, each node $v_{i,j}$ at levels 1, . . . , t−1 is labeled with a 0/1 valued hypothesis function $h_{i,j}$. In the t-th stage, hypothesis functions are assigned to each of the t nodes $v_{0,j}$ through $v_{t,t+1}$, at level t. Given an example x∈X in stage t, the branching program routes the example by evaluating $h_{0,1}$ on x and then sending the example on the outgoing edge whose label is $h_{0,1}$ (x), i.e., sending it to node $v_{h_{0,1}(x), 1}$. The example is then routed through successive levels in this way until it reaches level t. In other words, when example x reaches some node $v_{0,j}$ in level j, it is routed from there via the outgoing edge whose label is $h_{i,j}$ (x) to the node $v_{i+hi,j(x),j+1}$. In this fashion, the example x eventually reaches the node $v_{l,t}$ after being evaluated on (t−1) hypotheses, where l is the number of these (t−1) hypotheses that evaluated to 1 on x.

Thus, in the t-th stage of boosting, given an initial distribution D over examples x, the hypotheses that have been assigned to nodes at levels 1, . . . , t−1 of the branching program induce t different distributions $D_{0, t}, \ldots, D_{t-1, t}$ corresponding to the t nodes $v_{0,t}, \ldots, v_{t-1,t}$ in layer t. It will be understood that a random draw x from distribution $D_{0,t}$ is a draw from D conditioned on x reaching $v_{i,t}$.

Once all T stages of boosting have been performed, the resulting branching program routes any example x to some node $v_{0,T+1}$ at level T+1. Let l denote the number of hypotheses that evaluated to 1 out of the T hypotheses, which were evaluated on x. The final classifier computed by the branching program is simple: given an example x to classify, if the final node $v_{l,T+1}$ that x reaches has $l \geq T/2$, then the output is 1; otherwise the output is 0.

It will be noted that the martingale boosting algorithm described with reference to FIG. 1 invokes the weak learner t separate times in stage t, once for each of the t distinct $D_{0,t}, \ldots, D_{t-1,t}$ corresponding to the t nodes $v_{0,t}, \ldots, v_{t-1,t}$ in layer t. The hypothesis $h_{i,t}$ is not obtained merely by running the weak learner on $D_{i,t}$ and taking the resulting hypothesis to be $h_{i,t}$, but by constructing a total of T(T+1)/2 weak hypotheses. Any single example x encounters only T of these hypotheses in its path through the branching program.

The martingale boosting algorithms are designed to combine predictor methods for sorted objects into classes, each of which are weak on their own, but which might be combined to form a strong aggregate predictor. The algorithms may be modified to combine continuous scores or figures of merit instead of combining discrete or binary (e.g., yes or no) predictions.

The martingale boosting algorithms of the present invention can be used for boosting a two-sided weak learner h. For example, $c:X \rightarrow \{0,1\}$ may be a target function to be learnt with high accuracy with respect to the distribution D over X. In this example, the distributions $D^+$ and $D^-$ are defined with respect to c. By definition, a hypothesis $h:X \rightarrow \{0,1\}$ is said to have a two-sided advantage $\gamma$ with respect to D if it satisfies both:

$$Pr_{x \in D+}[h(x)=1] \geq \frac{1}{2}+\gamma, \quad (2a)$$

and $$Pr_{x \in D^-}[h(x)=0] \geq 1/2+\gamma. \quad (2b)$$

Such a hypothesis performs noticeably better than random guessing both on positive examples and on negative examples. A two-sided weak learner h, when invoked on target concept c and distribution D, outputs a hypothesis with a two-sided advantage $\gamma$. The analysis of a standard weak learner may be reduced to the case of the two-sided model.

The general boosting framework described above with reference to FIG. 1 can be used to boost a two-sided weak learner h to high accuracy. In a two-sided boosting scheme ("Basic MartiBoost"), in learning stage t at each node $v_{i,t}$ the two-sided weak learner is run on examples drawn from $D_{i,t}$, which is the distribution obtained by filtering D to accept only those examples that reach node $v_{i,t}$. The resulting hypothesis, which has a two-sided advantage $\gamma$ with respect to $D_{i,t}$, is then used as the hypothesis function $h_{i,t}$ labeling node $v_{i,t}$.

In the Basic MartiBoost scheme, let h denote the final branching program that is constructed by the algorithm. A random example x drawn from $D^+$ (i.e., a random positive example) is routed through h according to a random walk that is biased toward the right, and a random example x drawn from $D^-$ is routed through h according to a random walk that is biased toward the left. Example x is classified by h according to whether x reaches a final node $v_{l,T+1}$ with $l \geq T/2$ or $l < T/2$. This classification implies that h has high accuracy on both random positive examples and random negative examples. A random positive example x (i.e., x is distributed according to D+) follows a random walk biased to the right. Conversely, a random negative example follows a random walk biased to the left. For any node $v_{i,t}$, conditioned on positive example x reaching node $v_{i,t}$, x is distributed according to $(D_{i,t})^+$. Consequently, by the definition of two-sided advantage, x goes from node $v_{i,t}$ to node $v_{i+1,t+1}$, with a probability of at least $\frac{1}{2}+\gamma$ (i.e., x follows a random walk biased to the right). Similarly, for any node $v_{i,t}$, a random negative example x that reaches node $v_{i,t}$ will proceed to node $v_{i,t+1}$ with a probability of at least $\frac{1}{2}+\gamma$. Thus random negative examples follow a random walk biased to the left.

The standard bounds on random walks imply that if $T=O(\log(1/\epsilon)/\gamma^2)$, then the probability that a random positive example x ends up at a node $v_{l,T=1}$ is at most $\epsilon$. The same holds for random negative examples, and thus h has an overall accuracy at least $1-\epsilon$ with respect to D. Theorem 1 below holds for the two-sided Basic MartiBoosting algorithm.

Theorem 1. Let $\gamma_1, \gamma_2, \ldots, \gamma_T$ be any sequence of values between 0 and $\frac{1}{2}$. For each value $t=1, \ldots, T$, suppose that each of the t invocations of the weak learner on distributions $D_{i,t}$ lp;6q with $0 \leq i \leq t-1$ yields a hypothesis $h_{i,t}$ which has a two-sided advantage $\gamma_t$ with respect to $D_{i,t}$. In these conditions, the final output hypothesis that the Basic MartiBoost algorithm computes will satisfy:

$$Pr_{x \in D+}[h(x) \neq c(x)] \leq exp(-(\Sigma \gamma t)^2/(2T)). \quad (3)$$

For brevity, formal mathematical proofs of Theorem 1 and other related Theorems 2-6 discussed herein are not included herein. However, formal mathematical proofs of the theorems, properties, and features of the inventive martingale boosting algorithms can be found in P. Long and R. Servedio, "Martingale Boosting," Eighteenth Annual Conference on Computational Learning Theory (COLT), 2005, pp. 79-94, which is incorporated by reference herein in its entirety.

The usual assumption made in boosting data analysis is the availability of access to a standard weak learning algorithm, which when invoked on target concept c and distribution D outputs a hypothesis h that has an advantage with respect to D. By definition, a hypothesis $h:X \rightarrow \{0,1\}$ is said to have advantage $\gamma$ with respect to D if it satisfies:

$$Pr_{x \in D}[h(X)=c(x)] \geq \frac{1}{2}+\gamma. \quad (4)$$

This assumption is less demanding than the two-sided weak learner considered above. However, the Basic MartiBoost algorithm for the two-sided weak learner can be modified to boost a standard weak learner to high accuracy.

The modified algorithm ("MartiBoost") to boost a weak learner works as follows: In stage t, at each node $v_{i,t}$, the weak learning algorithm is run on $D_{i,t}$, which is a balanced version of the distribution $D_{i,t}$ (i.e., which puts equal weight on positive and negative examples). If $g_{i,t}$ denotes the hypothesis that the weak learner returns, the hypothesis $h_{i,t}$ that is used to label $v_{i,t}$ is given by $g_{i,t}$, namely $g_{i,t}$ balanced with respect to the balanced distribution $D_{i,t}$.

Theorem 2 below holds for the MartiBoosting algorithm.

Theorem 2. Let $\gamma_1, \gamma_2, \ldots, \gamma_T$ be any sequence of values between 0 and $\frac{1}{2}$. For each value $t=1, \ldots, T$, suppose that each of the t invocations of the weak learner on balanced distributions $D_{i,t}$ with $0 \leq i \leq t-1$, yields a hypothesis $g_{i,t}$ which has advantage $\gamma_t$ with respect to the balanced $D_{i,t}$. In these conditions, the final branching program hypothesis that MartiBoost constructs will satisfy:

$$Pr_{x \in D}[h(x) \neq c(x)] \leq exp(-(\Sigma \frac{1}{2}+\gamma_t)^2/8T). \quad (5)$$

In an exemplary embodiment, the MartiBoost algorithm is run on a fixed sample. In this case all relevant probabilities can be maintained explicitly in a look-up table, and then Theorem 2 bounds the training set accuracy of the MartiBoost. In another exemplary embodiment, the MartiBoost algorithm is given access to an example oracle EX(c, D). In this version of the algorithm, for efficiency the execution of the algorithm may be frozen at nodes $v_{i,t}$ where it is too expensive to simulate the balanced distributions $D_{i,t}$.

Weak learning in the example oracle EX(c, D) framework may be defined as follows: Given a target function $c:X \rightarrow \{0, 1\}$, an algorithm A is said to be a weak learner if it satisfies the following property: for any $\delta > 0$ and any distribution D over X, if A is given $\delta$ and access to EX(c, D), then algorithm A outputs a hypothesis $h:X \rightarrow \{0,1\}$, which with a probability of at least $1-\delta$ satisfies:

$$Pr_{x \in D}[h(x)=c(x)] \geq \frac{1}{2}+\gamma. \quad (6)$$

By definition, $m_A(\delta)$ is the running time of algorithm A, where one time step is charged for each invocation of the oracle EX(c, D). In instances where algorithm A is run using a simulated oracle EX(c, D'), but with access only to oracle EX(c, D), the running time will be at most $m_A(\delta)$ times the amount of time it takes to simulate a draw from EX(c, D') given EX(c, D).

An idealized version of the oracle algorithm ("Sampling MartiBoost", or "SMartiBoost") is designed to work with random examples assuming that all required probabilities can be computed exactly. For convenience, let r denote all of the random bits used by all the hypotheses $h_{i,t}$. It may be convenient to think of r as an infinite sequence of random bits that is determined before the algorithm starts and then read off one at a time as needed by the algorithm. In stage t of SMartiBoost, all nodes at levels t'<t have been labeled and the algorithm is labeling the t nodes $v_{0,t}, \ldots, v_{t-1,t}$ in layer t. In the following, the probability that $Pr_{x \in D,r}[x \text{ reaches } v_{i,t}]$ may be denoted as $p_{i,t}$. Further, for each $b \in \{0,1\}$, the probability that $Pr_{x \in D,r}[x \text{ reaches } v_{i,t}$ and the label of x is b] is denoted by $p^b_{i,t}$, so that $p_{i,t} = p^0_{i,t} + p^1_{i,t}$.

In stage t, for each node $v_{i,t}$ the SMartiBoost algorithm does the following operations:

1. If $\min_{b \in \{0,1\}} p^b_{i,t} < \epsilon/T(T+1)$, then the SMartiBoost algorithm "freezes" node $v_{i,t}$ by labeling it with the bit (1-b) and making it a terminal node with no outgoing edges so that any example x which reaches $v_{i,t}$ will be assigned label (1-b) by the branching program hypothesis.

2. In the converse case $\min_{b \in \{0,1\}} p^b_{i,t} \geq \epsilon/T(T+1)$, the SMartiBoost algorithm works just like the MartiBoost algorithm in that it runs the weak learning algorithm on the balanced version $D_{i,t}$ to obtain a hypothesis $g_{i,t}$. The algorithm labels $v_{i,t}$ with $h_{i,t} = g_{i,t}$, which is $g_{i,t}$ balanced with respect to $D_{i,t}$.

Each node $v_{i,t}$ which is frozen in operation (1) above contributes at most $\epsilon/T(T+1)$ to the error of the final branching program hypothesis. The total error induced by all frozen nodes is at most $\epsilon/2$, since there are at most $T(T+1)/2$ nodes in the branching program. Conversely, in the case $\min_{b \in \{0,1\}} p^b_{i,t} \geq \epsilon/T(T+1)$ for any node $v_{i,t}$ which is not frozen, the expected number of draws from EX(c, D) that are required to simulate a draw from EX(c, D) is $O(T^2/\epsilon)$. Thus, the weak learner can be run efficiently on the desired distributions.

Theorem 3 below establishes the correctness of the SMartiBoost algorithm when all required probabilities are known exactly.

Theorem 3. Let $T = 8 \ln(2/\epsilon)/(\gamma^2)$. Suppose that each time the SMartiBoost algorithm is invoked on some balanced distribution $D_{i,t}$, the weak learner outputs a hypothesis that has an advantage $\gamma$ with respect to $D_{i,t}$. Then, the final branching program hypothesis h that SMartiBoost constructs will satisfy:

$$Pr_{x \in D}[h(x) \neq c(x)] \leq \epsilon \qquad (7)$$

In the case where all required probabilities are not known exactly (i.e., in the presence of sampling error), Theorem 4 below establishes the correctness of the SMartiBoost algorithm.

Theorem 4. Let $T = \Theta(\log(1/\epsilon)/(\gamma^2))$, and the notation $\tilde{O}$ hide polylogarithmic factors for the sake of readability. If A is a weak learning algorithm that requires $s_A$ many examples to construct a $\gamma$-advantage hypothesis, then SMartiBoost makes $O(s_A) \cdot \tilde{O}(1/\epsilon) \cdot \text{poly}(1/\gamma)$ many calls to EX(c, D) and with a probability of $(1-\delta)$ outputs a final hypothesis h that satisfies:

$$Pr_{x \in D}[h(x) \neq c(x)] \leq \epsilon. \qquad (8)$$

The SMartiBoost algorithm can be further modified to withstand random classification noise. Given a distribution D and a value $0 < \eta < \frac{1}{2}$, a noisy example oracle is an oracle EX(c, D, $\eta$) which is defined as follows: each time EX(c, D, $\eta$) is invoked, it returns a labeled example (x, b) $\in X \times \{0, 1\}$, where $x \in X$ is drawn from the distribution D, and b is chosen to be c(x) with a probability of $(1-\eta)$ and chosen to be $(1-c(x))$ with a probability of $\eta$.

It is useful here to recount the definition of weak learning. Weak learning may be defined as follows: Given a target function $c: X \rightarrow \{0,1\}$, an algorithm A is said to be a noise-tolerant weak learning algorithm with an advantage $\gamma$ if it satisfies the following property: for any $\delta > 0$ and any distribution D over X, if A is given $\delta$ and access to a noisy example oracle EX(c, D, $\eta$) where $0 < \eta < \frac{1}{2}$, then A runs in time poly $(1/(1-2\eta), 1/\delta)$ and, with a probability of at least $(1-\delta)$, A outputs a hypothesis h that satisfies:

$$Pr_{x \in D}[h(x) = c(x)] \geq \frac{1}{2} + \eta. \qquad (9)$$

In general for boosting algorithms, it is mathematically impossible to achieve an arbitrarily low error rate a below the noise rate $\eta$. However, the noise-tolerant variant of the SMartiBoost algorithm, like the known modified Mansour and McAllester boosting algorithm, can achieve an error rate $\epsilon = \eta + \tau$, in time polynomial in $1/\tau$ and the other relevant parameters. (See e.g., Mansour and McAllester, "Boosting Using Branching Programs," Journal of Computer and System Sciences, 64(1), pp. 103-112, 2002).

A reason why SMartiBoost can be easily modified to withstand random classification noise is because in each stage t of boosting, the label b of a labeled example (x, b) plays only a limited role in the reweighting that the example experiences. Since this role is limited, it is possible to efficiently simulate the distributions that the weak learner requires at each stage of boosting and thus for the overall boosting process to succeed.

For example, as a labeled example (x, b) proceeds through levels 1, . . . , t-1 of the branching program in stage t, the path it takes is completely independent of b. Thus, given a source EX(c, D, $\eta$) of noisy examples, the distribution of examples that arrive at a particular node $v_{i,t}$ is precisely EX(c, $D_{i,t}$, $\eta$). However, once a labeled example (x, b) arrives at some node $v_{i,t}$, label b must be consulted in the "rebalancing" of the distribution $D_{i,t}$ to obtain distribution $D_{i,t}$. More precisely, the labeled examples that reach node $v_{i,t}$ are distributed according to EX(c, $D_{i,t}$, $\eta$), but to use SMartiBoost with a noise-tolerant weak learner requires simulation of the balanced distribution $D_{i,t}$ corrupted with random classification noise, i.e., EX(c, $D_{i,t}$, $\eta'$). It is not necessary that the noise rate $\eta'$ in the balanced case be the same as $\eta$. The SMartiBoost algorithm will work as long as the noise rate $\eta'$ is not to close to $\frac{1}{2}$.

Simulation of the balanced distribution $D_{i,t}$ corrupted with random classification noise EX(c, $D_{i,t}$, $\eta'$) can take place according to the following rejection sampling procedure Lemma, which is similar to that described in A. Kalai and R. Servedio, "Boosting In The Presence Of Noise," Proc. 35th Annual Symposium on Theory of Computing (STOC), pages 196-205, 2003.

Rejection Sampling Procedure Lemma: Let $\tau > 0$ be any value satisfying $\eta + \tau/2 < \frac{1}{2}$. Suppose we have access to EX(c, D, $\eta$). Let p denote $Pr_{x \in D}[c(x) = 1]$. Further, suppose that $\eta + \tau/2 \leq p \leq \frac{1}{2}$. Given a draw (x, b) from EX(c, D, $\eta$):

1. If b=0, then with a probability of $p_r = (1-2p)/(1-p-\eta)$ reject (x, b), and with a probability of $1 - p_r = (p-\eta)/(1-p-\eta)$ set b'=b and accept (x, b');

2. If b=1, then set b'=1-b with probability $p_f = (1-2p)\eta(1-\eta)/(1-p-\eta)/(p+\eta-2p\eta)$ reject (x, b), set b'=b with a probability of $1-p_f$, and accept (x, b').

Given a draw from EX(c, D, $\eta$), the foregoing procedure rejects with a probability:

$$p_{rej} = (1-2p)(p\eta + (1-p)(1-\eta))/(1-p-\eta-2p\eta) \qquad (10a)$$

and accepts with a probability:

$$1 - p_{rej} = 2(1-2\eta)(1-p)p/(1-p-\eta-2p\eta). \qquad (10b)$$

Moreover, if the procedure accepts, then the (x, b') that it accepts is distributed according to EX(c, D, $\eta'$), where $\eta' = \frac{1}{2} - (p-\eta)/2(p+\eta-2p\eta)$.

The operation of the noise-tolerant SMartiBoost is described in the following: As previously, $p_{i,t}$ denotes the probability that $Pr_{x \in D, r}[x \text{ reaches } v_{i,t}]$. Further, $q^b_{i,t}$ denotes the probability $Pr_{x \in D, r}[c(x) = b | x \text{ reaches } v_{i,t}] = Pr_{x \in D, r}[c(x) = b]$, so that $q^0_{i,t} = 1, q^1_{i,t} = 0$. The noise-tolerant SMartiBoost takes as input a parameter $\tau$, where $\eta + \tau$ is a desired final accuracy. Without loss of generality, it may be assumed that $\eta + \tau < \frac{1}{2}$.

In stage t, the noise-tolerant SMartiBoost algorithm does the following operations for each node $v_{i,t}$:

1. If $p^b_{i,t} < 2\tau/3T(T+1)$, then the algorithm "freezes" node $v_{i,t}$ by labeling it with an arbitrary bit and making it a terminal node with no outgoing edges.

2. If min $b_{\epsilon\{0,1\}}q^b_{i,t}<\eta/+\tau/3$, then the algorithm "freezes" node $v_{i,t}$ by making it a terminal node labeled (1-b) with no outgoing edges.

3. Otherwise, the algorithm runs the weak learning algorithm using $EX(c, D_{i,t}, \eta')$ as described in the Rejection Sampling Procedure Lemma to obtain a hypothesis $g_{i,t}$. The algorithm labels $v_{i,t}$ with $h_{i,t}=g_{i,t}$, which is $g_{i,t}$ balanced with respect to $D_{i,t}$.

Theorem 5 below establishes the correctness of the noise-tolerant SMartiBoost algorithm when all required probabilities are known exactly.

Theorem 5. Let $T=8 \ln(2/\epsilon)/(\gamma 2)$. Suppose that each time a weak learner is invoked with some oracle $EX(C, D_{i,t}, \eta')$, and the weak learner outputs a hypothesis $g_{i,t}$ with $Pr_{x \in Di,t}[g_{i,t}=c(x)] \geq \frac{1}{2}+\gamma$. Then the final branching program hypothesis h that the noise-tolerant SMartiBoost constructs will satisfy:

$$Pr_{x \in Di,t}[h(x) \neq c(x)] \leq \eta+\tau. \quad (11)$$

In the case where all required probabilities are not known exactly, sufficiently accurate estimates of the probabilities can be obtained via a polynomial amount of sampling. Theorem 6 below establishes the correctness of the noise-tolerant SMartiBoost algorithm in such case.

Theorem 6. Given any $\tau$ such that $\eta+\tau<\frac{1}{2}$, let $T=\Theta(\log(1/\epsilon)/(\gamma^2))$. If A is a noise-tolerant weak learning algorithm with an advantage $\gamma$, then the noise-tolerant SMartiBoost makes poly($1/\gamma$, $1/\tau$, $1/\delta$) many calls to $EX(c, D, \eta)$ and with a probability of $(1-\delta)$ outputs a final hypothesis h that satisfies:

$$Pr_{x \in D}[h(x) \neq c(x)] \leq \eta+\tau. \quad (12)$$

Because of their simplicity and attractive theoretical properties, the inventive martingale boosting algorithms may advantageously be used in practical machine learning applications. A practical algorithm may involve repeatedly dividing the training data into bins, as opposed to using fresh examples during each stage as discussed above, for example, with respect to FIG. 1 and Theorem 1.

In an exemplary application, a machine learning system based on a martingale ranking algorithm is utilized for feeder failure prediction in a commercial electrical power distribution system.

In the commercial power distribution system, power generated at remote power plants is delivered to residential, business, or industrial customers via a transmission network or grid. Power is first transmitted as high voltage transmissions from the remote power plants to geographically diverse substations. At the substations, the received high voltage power is sent over "feeders" to transformers that have low voltage outputs. The outputs of the transformers are connected to a local low voltage power distribution grid that can be tapped directly by the customers.

In metropolitan areas (e.g., Manhattan) the feeders run under city streets, and are spliced together in manholes. Multiple or redundant feeders may feed the customer-tapped grid, so that individual feeders may fail without causing power outages. However, multiple or collective feeder failures appear to be a potential failure mode through which power outages could occur. Preventive maintenance of the feeders is desirable. However, preventive maintenance schemes based on maintenance of every feeder in the system are expensive, cumbersome, and disruptive. Accordingly, power companies and utilities have developed empirical models for evaluating the danger that a feeder could fail. These models provide likelihood-of-failure scores, which may be used to prioritize repairs or maintenance. However, in practice, the scores obtained by using the empirical models are a weak guide and provide only a rough indication of likely failure events.

Machine learning systems and methods based on martingale boosting or ranking algorithms may be advantageously applied to improve feeder failure predictions.

One such machine learning system utilizes an input database, which includes a list of feeders, a list of scores for each feeder, and a historical record or count of recent failures for each feeder. The list of scores may capture the strength of evidence from a variety of sources or models that the particular feeder is error or failure prone.

Figure 2:
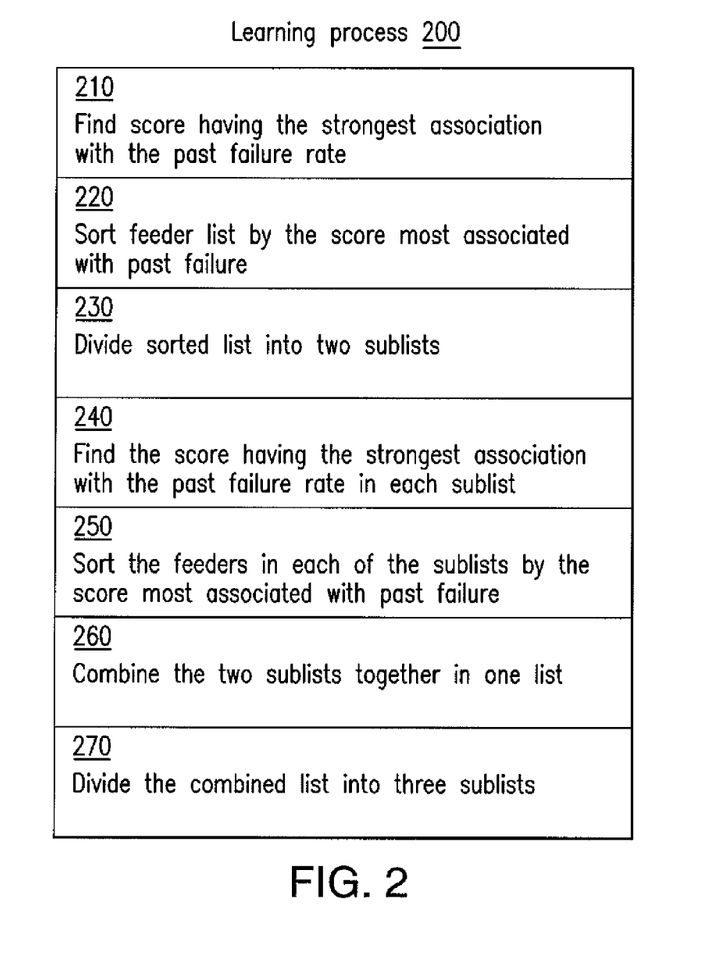
FIG. 2 illustrates a machine learning process for ranking feeders in an electrical power distribution system in order of their predicted likelihood of failure, in accordance with the principles of the present invention.
Figure 3:
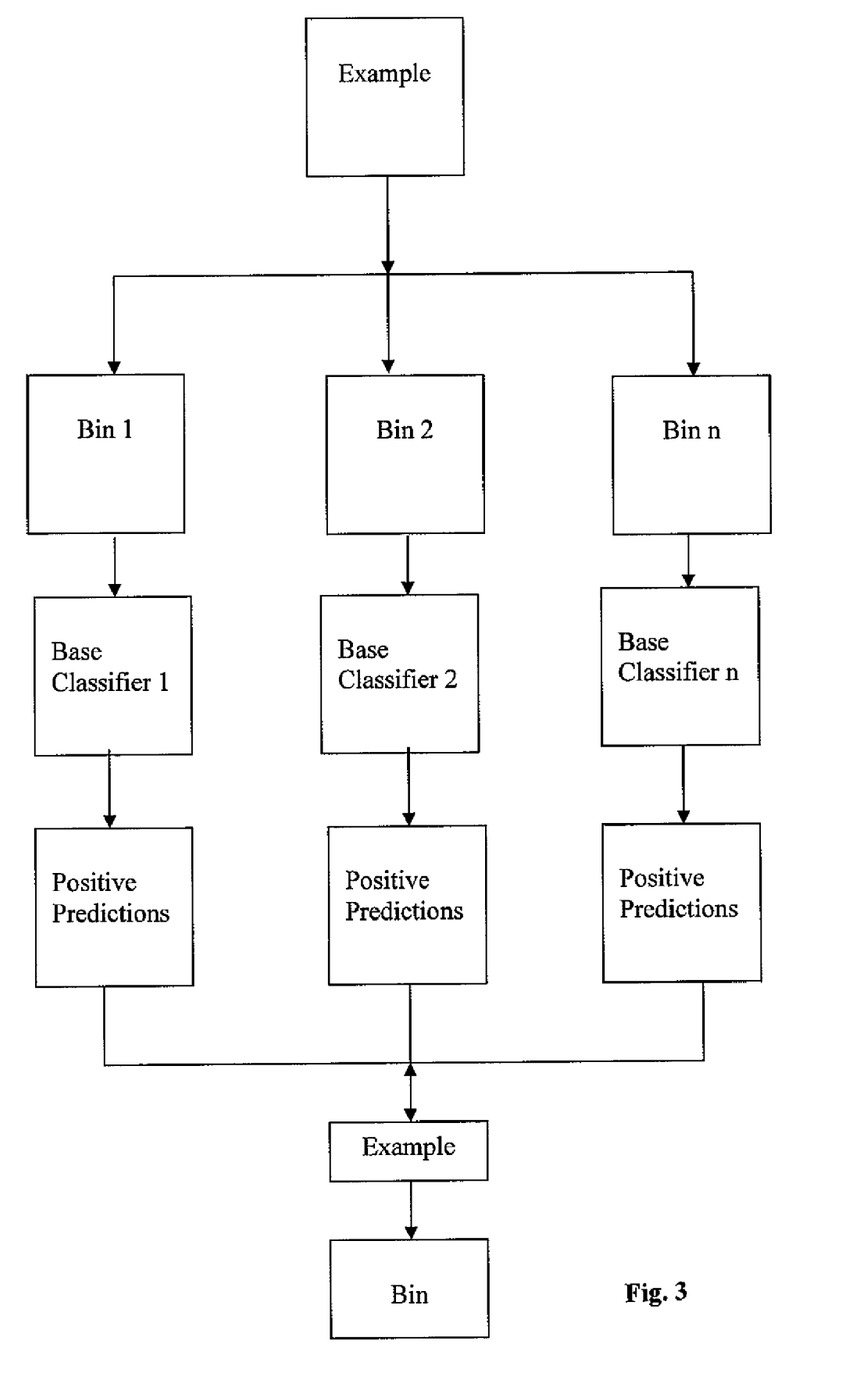
FIG. 3 illustrates an exemplary machine learning method according to a non-limiting embodiment.
Figure 4:
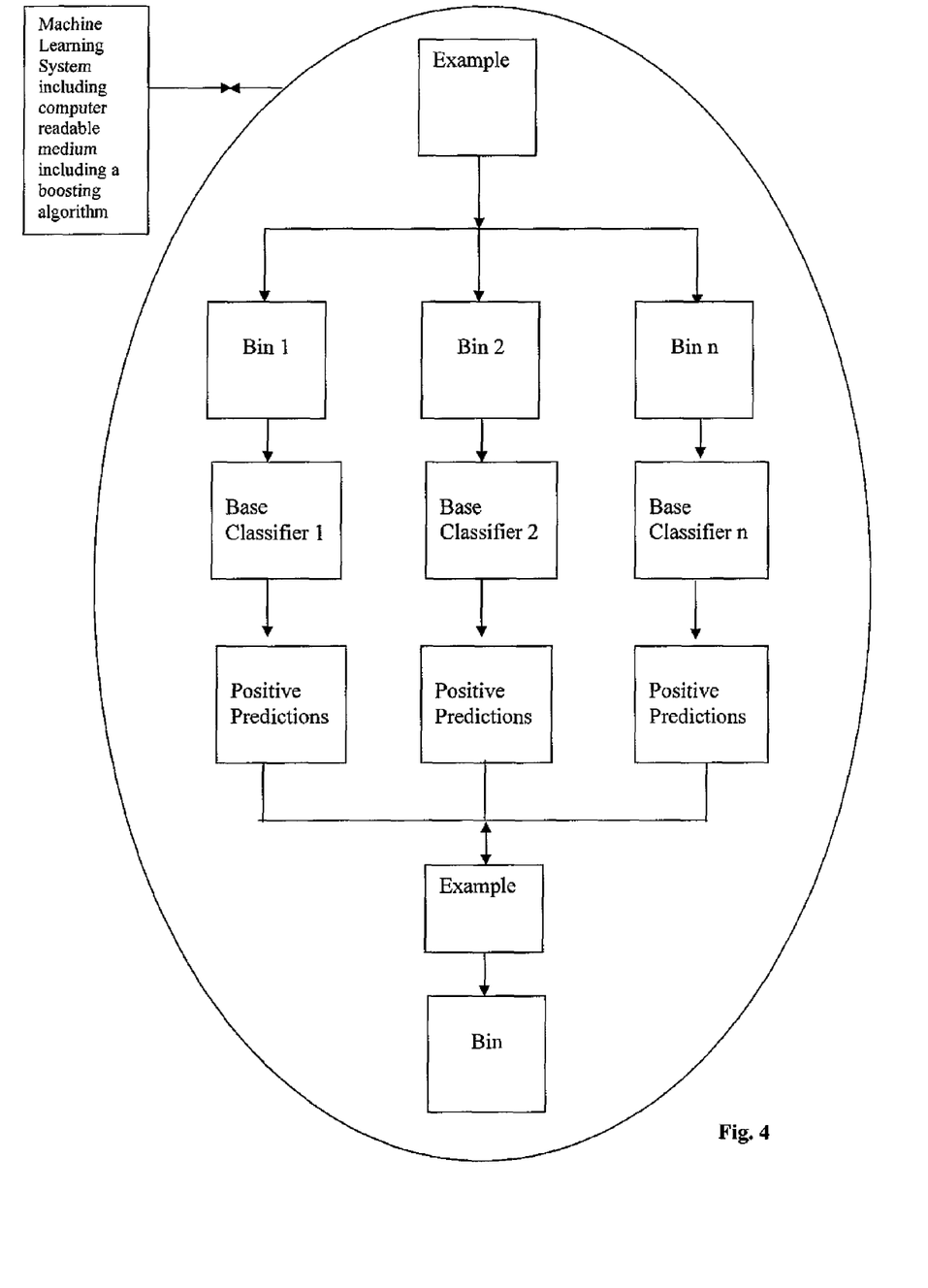
FIG. 4 illustrates an exemplary machine learning system according to a non-limiting embodiment.
Figure 5:
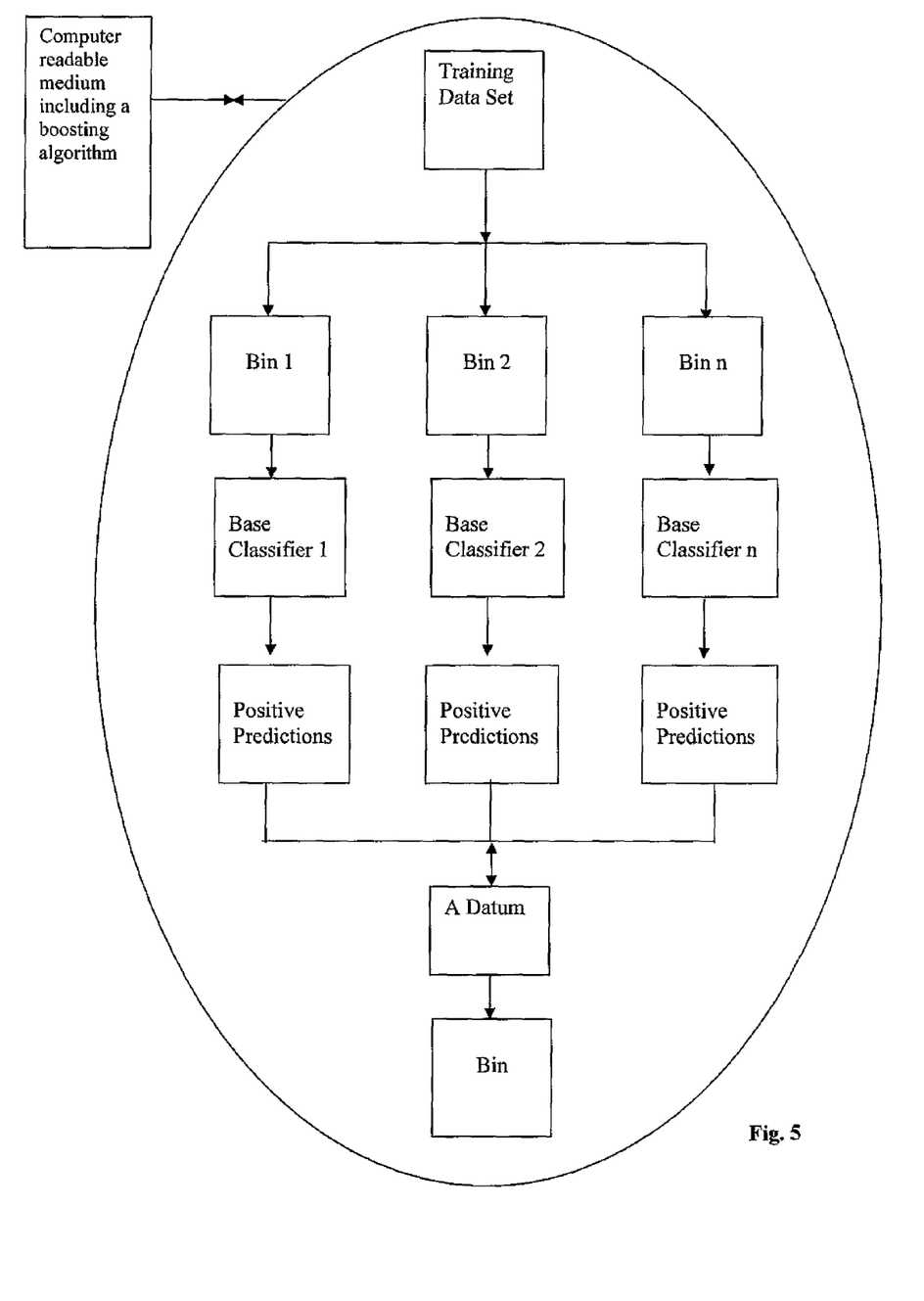
FIG. 5 illustrates an exemplary computer readable medium for machine learning according to a non-limiting embodiment.

FIG. 2 shows exemplary learning process 200 in the machine learning system for feeder failure predictions. At 210, the martingale boosting algorithm in the machine learning system, finds the score or variable that has the strongest association with the past failure rate. For this purpose, the algorithm may be suitably coded, for example, to maximize a popular measure called the "Area Under The ROC Curve." Alternative measures may be used. At 220, the algorithm sorts the feeder list by the score or variable that has the strongest association with past failure. Then at 230, the algorithm divides the sorted list into two sublists so that past outages or failures are apportioned equally or at least approximately equally between the two sublists. At 240, the algorithm determines the scores or variables that are best associated with the failure rate in each of the sublists and accordingly sorts the feeders in each of the sublists (250). At 260, the two sublists are combined together in one list. Next at 270, the combined list is divided into three sublists so that past outages or failures are apportioned equally or at least approximately equally between the three sublists.

Training continues iteratively in the manner of 210-270. In the iterations, the list of feeders is progressively divided into finer and finer sublists. The algorithm determines the scores or variables that are best associated with the failure rate in each of the sublists and accordingly sorts each of the sublists. The sorted sublists are then recombined before the next finer iteration or division. After a number of iterations of sublist divisions, re-sorting and recombinations, the particular feeders that are predicted to be the most likely to fail are expected to rise to the top of the recombined list. Thus, the feeders are ranked in order of their predicted likelihood of failure. Maintenance schedules for the feeders may advantageously give priority to the feeders at the top of the list.

In machine learning practice, the number of sublist divisions and resorting steps may be suitably limited by considerations of processing time, cost, and return.

In accordance with the present invention, software (i.e., instructions) for implementing the aforementioned machine learning systems and methods (algorithms) can be provided on computer-readable media It will be appreciated that each of the steps (described above in accordance with this invention), and any combination of these steps, can be implemented by computer program instructions. These computer program instructions can be loaded onto a computer or other programmable apparatus to produce a machine such that the instructions, which execute on the computer or other programmable apparatus, create means for implementing the functions of the aforementioned machine learning systems and methods. These computer program instructions can also be stored in a computer-readable memory that can direct a computer or other programmable apparatus to function in a particular manner such that the instructions stored in the computer-readable memory produce an article of manufacture including instruction means, which implement the functions of the aforementioned machine learning systems and methods. The computer program instructions can also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions of the aforementioned machine learning systems and methods. It will also be understood that the computer-readable media on which instructions for implementing the aforementioned machine learning systems and methods are to be provided include, without limitation, firmware, microcontrollers, microprocessors, integrated circuits, ASICS, and other available media.

The foregoing merely illustrates the principles of the invention. Various modifications and alterations to the described embodiments will be apparent to those skilled in the art in view of the teachings herein, including by combining different features from different disclosed embodiments. It will thus be appreciated that those skilled in the art will be able to devise numerous techniques which, although not explicitly described herein, embody the principles of the invention and are thus within the spirit and scope of the invention.

The invention claimed is:

1. A machine learning method having a multiple number of learning stages, each learning stage comprising:
    partitioning, using a computer processor, examples into bins;
    choosing, using a computer processor, a base classifier for each bin; and
    assigning, using a computer processor, an example to a bin by counting the number of positive predictions previously made by the base classifier associated with the bin.

2. The method of claim 1, wherein assigning an example to a bin comprises classifying an example by a random walk on the number of base classifiers that are positive predictions.

3. The method of claim 1, wherein assigning an example to a bin comprises balancing error rates substantially equally between false positives and false negatives.

4. The method of claim 1, wherein assigning an example to a bin comprises assigning a particular example to a particular bin independent of any label associated with the example.

5. The method of claim 1, further comprising using decision stumps as base classifiers.

6. A machine learning system for automated learning in stages, the system comprising a computer readable medium including a boosting algorithm that is configured at each learning stage to:
    partition examples into bins;
    choose a base classifier for each bin; and
    assign an example to a bin by counting the number of positive predictions previously made by the base classifier associated with the bin, whereby at each learning stage the false positive and false negative error rates are substantially balanced.

7. A computer readable medium for machine learning from a training data set, the computer readable medium comprising a set of instructions for:
    partitioning the training data set into bins;
    choosing a base classifier for each bin; and
    assigning a datum to a bin by counting the number of positive predictions previously made by the base classifier associated with the bin.

8. A machine learning method for predicting the behavior of objects, wherein past behaviors of the objects are known and wherein the objects are associated with a plurality of scores that are predictive of object behavior, the method having a multiple number of learning stages, each learning stage comprising:
    partitioning, using a computer processor, a list of objects into a number of sublists so that past behaviors of the objects are distributed substantially evenly across the number of sublists;
    for each sublist, choosing, using a computer processor, a predictive score from the plurality of predictive scores associated with the objects in the sublist;
    for each sublist, ranking, using a computer processor, objects in the sublist according to the chosen predictive score; and then
    recombining, using a computer processor, the sublists to generate a list in which the objects are ranked according to the predictive scores chosen for the respective sublists.

9. The method of claim 8, wherein choosing a predictive score for each sublist comprises selecting the predictive score that most accurately predicts the past behavior of the objects in the sublist.

10. The method of claim 8, wherein partitioning a list of objects into a number of sublists comprises partitioning the list of objects into an increasing number of sublists at each successive learning stage.

11. The method of claim 8, wherein the objects are feeders in an electrical power distribution system, and wherein the past behaviors are feeder failure events.

12. A machine learning system for predicting the failure of feeders in an electrical power distribution system, wherein past feeder failure events are known and wherein the feeders are associated with a plurality of scores that are predictive of feeder failure, the system comprising a computer readable medium comprising an algorithm configured to process a list of feeders and the associated plurality of scores in a number of successive learning stages, each learning stage comprising:
    partitioning the list of feeders into a number of sublists so that the past feeder failure events are distributed substantially evenly across the number of sublists;
    for each sublist, choosing a predictive score from the plurality of predictive scores associated with the objects in the sublist;
    for each sublist, ranking feeders in the sublist according to the chosen predictive score; and then
    recombining the sublists to generate a list in which the feeders are ranked according to the predictive scores chosen for the respective sublists.

13. The machine learning system of claim 12, wherein the algorithm is configured to partition the list of feeders into an increasing number of sublists at each successive learning stage.

14. The machine learning system of claim 12, wherein the algorithm is configured to choose for a sublist the predictive score that most accurately predicts the past feeder failure events for the feeders in the sublist.

15. The machine learning system of claim 6, wherein the examples are training examples.

* * * * *

UNITED STATES PATENT AND TRADEMARK OFFICE
CERTIFICATE OF CORRECTION

PATENT NO. : 8,036,996 B2  
APPLICATION NO. : 12/045458  
DATED : October 11, 2011  
INVENTOR(S) : Philip M. Long et al.

It is certified that error appears in the above-identified patent and that said Letters Patent is hereby corrected as shown below:

Column 1, line 13, please insert the following header and paragraph:

--Statement Regarding Federally Sponsored Research or Development  
This invention was made with government support under grant number 0347282 awarded by the National Science Foundation. The government has certain rights in the invention.--

Signed and Sealed this  
Twenty-third Day of October, 2012

David J. Kappos  
*Director of the United States Patent and Trademark Office*